US011230032B2

(12) United States Patent
Post et al.

(10) Patent No.: US 11,230,032 B2
(45) Date of Patent: Jan. 25, 2022

(54) CABLE-DRIVEN ADDITIVE MANUFACTURING SYSTEM

(71) Applicant: UT-Battelle, LLC, Oak Ridge, TN (US)

(72) Inventors: Brian K. Post, Knoxville, TN (US); Lonnie J. Love, Knoxville, TN (US); Randall F. Lind, Loudon, TN (US); Phillip C. Chesser, Knoxville, TN (US); Alex C. Roschli, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 222 days.

(21) Appl. No.: 16/383,105

(22) Filed: Apr. 12, 2019

(65) Prior Publication Data
US 2019/0315016 A1    Oct. 17, 2019

Related U.S. Application Data

(60) Provisional application No. 62/657,020, filed on Apr. 13, 2018.

(51) Int. Cl.
| *B33Y 30/00* | (2015.01) |
| *B28B 1/00* | (2006.01) |
| *E04B 1/35* | (2006.01) |
| *B33Y 10/00* | (2015.01) |

(52) U.S. Cl.
CPC ............ *B28B 1/001* (2013.01); *E04B 1/3505* (2013.01); *B33Y 10/00* (2014.12); *B33Y 30/00* (2014.12); *E04B 2001/3588* (2013.01)

(58) Field of Classification Search
CPC ...... B29C 64/227; B29C 64/106; B29C 64/30; B29C 64/209; B66C 13/08; E04B 1/16
USPC .................................. 264/31, 32, 22, 34, 35
See application file for complete search history.

(56) References Cited

U.S. PATENT DOCUMENTS

| 7,401,961 B2 * | 7/2008 | Longatti | D04C 1/12 |
| | | | 362/311.06 |
| 7,641,461 B2 | 1/2010 | Khoshnevis | |
| 7,753,642 B2 | 7/2010 | Bosscher et al. | |

(Continued)

FOREIGN PATENT DOCUMENTS

| NL | 2019511 B1 * | 3/2019 | ............. B66C 23/70 |
| WO | WO-2017052124 A1 * | 3/2017 | ............. B25J 17/02 |

(Continued)

OTHER PUBLICATIONS

N. Labonnote, et al, Additive construction: State of the art, challenges and opportunities, Automation in Construction (2016), pp. 1-20, http://dx.doi.org/10.1016/j.autcon.2016.08.026.

(Continued)

*Primary Examiner* — Joseph S Del Sole
*Assistant Examiner* — Margaret B Hayes
(74) *Attorney, Agent, or Firm* — Warner Norcross + Judd LLP

(57) ABSTRACT

A cable-driven additive manufacturing system includes an end effector configured for linear translation within a three-dimensional workspace, an aerial hoist suspending the end effector by at least one suspension cable, a plurality of base stations disposed below the aerial hoist, and control cables running from each of the base stations to the end effector.

20 Claims, 8 Drawing Sheets

(56) References Cited

U.S. PATENT DOCUMENTS

| | | | | | |
|---|---|---|---|---|---|
| 2013/0292039 | A1* | 11/2013 | Peters | .................... | B33Y 30/00 |
| | | | | | 156/168 |
| 2014/0262520 | A1* | 9/2014 | Petrello | .................. | E21B 19/00 |
| | | | | | 175/57 |
| 2017/0095973 | A1* | 4/2017 | Chamberlain | ......... | B33Y 30/00 |
| 2017/0232549 | A1* | 8/2017 | Lacaze | .................. | B33Y 80/00 |
| | | | | | 164/469 |
| 2017/0350115 | A1* | 12/2017 | Rocher | ................. | B33Y 30/00 |
| 2020/0216294 | A1* | 7/2020 | Stoof | ................... | B66C 23/185 |
| | | | | | 212/273 |

FOREIGN PATENT DOCUMENTS

| | | | |
|---|---|---|---|
| WO | 2017174201 | A1 | 10/2017 |
| WO | 2017176150 | A1 | 10/2017 |
| WO | 2018162858 | A1 | 9/2018 |
| WO | 2019025698 | A1 | 2/2019 |

OTHER PUBLICATIONS

Freek Bos, et al, Additive manufacturing of concrete in construction: potentials and challenges of 3D concrete printing, Virtual and Physical Prototyping, 2016, vol. 11, No. 3, pp. 209-225, http://dx.doi.org/10.1080/17452759.2016.1209867.

3ders.org—Frameless 'Hangprinter' RepRap turns an entire room into a 3D printer, 3D Printer News & 3D Printing News, Apr. 5, 2018, http://www.3ders.org/articles/20170308-frameless-hangprinter-rerap-turns-an-entire-room-into-a-3d-printer.html.

Jean-Baptiste Izard, et al, Large-scale 3D printing with cable-driven parallel robots, published online Aug. 30, 2017, pp. 1-8, Constr Robot.

US Army Corps of Engineers, Automated Construction of Expeditionary Structures (ACES), published Aug. 25, 2017, Updated Apr. 8, 2019, pp. 1-2, https://www.erdc.usace.army.mil/Media/Fact-Sheets/Fact-Sheet-Article-View/Article/1290247/automated-construction-of-expeditionary-structures-aces/.

3ders.org, LafargeHolcim and XtreeE successfully 3D print Europe's first concrete load bearing structural element, Sep. 21, 2016, pp. 1-11, downloaded Apr. 9, 2019, https://www.3ders.org/articles/20160921-lafargeholcim-and-xtreee-successfully-3d-print-europes-first-concrete-structural-element.html.

P.C. Chesser, et al, Fieldable Platform for Large-Scale Deposition of Concrete Structures, 35th International Symposium on Automation and Robotics in Construction (ISARC 2018), pp. 1-6.

Lim, Sungwoo; Buswell, Richard; Le, Thanh; Wackrow, Rene; Austin, Simon Austin; Gibb, Alistair and Thorpe, Tony (2011), Development of a viable concrete printing process, 28th International Symposium on Automation and Robotics in Construction (ISARC2011), Jun. 29-Jul. 2, 2011, Seoul, South Korea, pp. 665-670.

B. Khoshnevis, Automated construction by contour crafting-related robotics and information technologies, Automation in Construction 13 (2004), pp. 5-19.

Hangprinter, Wikipedia Apr. 9, 2019, pp. 1-5, https://en.wikipedia.org/wiki/Hangprinter.

Levy, Karyne, Business Insider, Apr. 14, 2014, pp. 1-3, http://www.businessinsider.com/a-chinese-company-3d-printed-10-houses-in-a-day-2014-4.

United States Army Corps of Engineers, Automated Construction of Expeditionary Structures (ACES), Jun. 16, 2016, https://www.youtube.com/watch?v=xvQ63RP_gUY.

Khoshnevis, Behrokh, Houses of the Future: Construction by Contour Crafting Building Houses for Everyone, http://craft.usc.edu/CC/images/houses_future.pdf.

* cited by examiner

CABLE-DRIVEN ADDITIVE MANUFACTURING SYSTEM

CROSS-REFERENCE TO RELATED APPLICATION

This application claims the benefit of U.S. Provisional Application 62/657,020, filed Apr. 13, 2018, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to additive manufacturing systems and methods for on-site additive manufacturing of buildings and other constructions.

Concrete additive manufacturing, or 3D printing, has taken off around the world because it is a relatively cost effective material with desirable material properties. For example, WinSun, a Chinese engineering company, has additively manufactured concrete buildings from recycled construction materials. WinSun has fabricated 10 homes in 24 hours by printing the pieces of a structure at one location, and assembling them at an off-site location. In Europe, Swiss company LafargeHolcim teamed up with French start-up, XtreeE, to print Europe's first structural, load-bearing element from concrete. Lastly, the United States Army Corps of Engineers (USACE) has developed an additive manufacturing process that fabricates unique concrete structures through a project called Automated Construction of Expeditionary Structures (ACES).

Construction contributes significantly to harmful emissions, and construction of a typical single-family home generates a waste stream of about 3 to 7 tons, for example. Although concrete creation is an energy intensive process, additive manufacturing allows structures to be fabricated in such a way that material is only deposited where necessary, which leads to much less material waste when comparted to traditional construction practices. Additive manufacturing also enables the fabrication of unique geometries that cannot be achieved through traditional methods. Any departure from standard rectilinear design significantly increases the cost of conventional construction. Additive manufacturing will allow customized designs to be created while saving energy and reducing waste.

To date, all concrete additive manufacturing is completed using gantry systems, which makes fieldability extremely limited. FIG. 1 shows a prior art example of a gantry system 10 fabricating a concrete building 12. Gantry systems require complicated set up and extensive site preparation to function properly.

On-site fabrication of structures has been demonstrated as a viable construction technique, regardless of suspension system type, but there are a few barriers that have kept on-site fabrication from becoming commercially implemented. Current barriers include: (1) 3D printed concrete structures are not as aesthetically appealing as current facade materials; (2) reinforcing the fabricated structure may be time consuming; (3) laying concrete masonry blocks is currently faster and cheaper than printing concrete; and (4) extensive construction site preparation is required for a gantry system to operate. Accordingly, there remains a continued need for improved large-scale, fieldable additive manufacturing systems.

SUMMARY OF THE INVENTION

An improved large-scale, fieldable or easily transportable additive manufacturing system is provided. Improved methods for on-site additive manufacturing of buildings and other constructions are also provided.

In one aspect of the invention, a cable-driven additive manufacturing system is provided.

In one embodiment, the cable-driven additive manufacturing system includes an end effector configured for linear translation within a three-dimensional workspace along an x-axis, y-axis, and a z-axis, an aerial hoist suspending the end effector within the three-dimensional workspace by at least one suspension cable, an aerial cable winder configured to control linear translation of the end effector along the z-axis, a plurality of motion-control base stations disposed below the aerial hoist and configured to control linear translation of the end effector in an x-y plane defined by the x-axis and the y-axis, each motion-control base station comprising a base station cable winder, a plurality of motion-control cables, at least one of the plurality of motion-control cables running from each of the base station cable winders to the end effector, at least one tension-control base station, and at least one tension-control cable running from the tension-control base station to the end effector.

The embodiments of the invention eliminate the need for a gantry system or other large framework for the large-scale additive manufacturing, and will eliminate the need for extensive site preparation, which has prevented on-site additive manufacturing from becoming commercially viable. Implementing a mechanized form of construction also reduces labor costs. On-site construction allows for shorter construction time, reduced site disruption, more consistent quality, flexibility of site use, and financial savings. Embodiments of the system offer a significant improvement over existing concrete methods because of the ease and versatility of set up and energy efficiency achieved through additive manufacturing.

These and other features and advantages of the present invention will become apparent from the following description of the invention, when viewed in accordance with the accompanying drawings and appended claims.

DETAILED DESCRIPTION OF THE CURRENT EMBODIMENT(S)

Disclosed is a large-scale cable-driven system for the deposition of structures from concrete or other cementitious material. The system is designed to be easily fieldable for use at an outdoor work site. Smaller-scale and/or indoor implementation are also contemplated.

Figure 1:
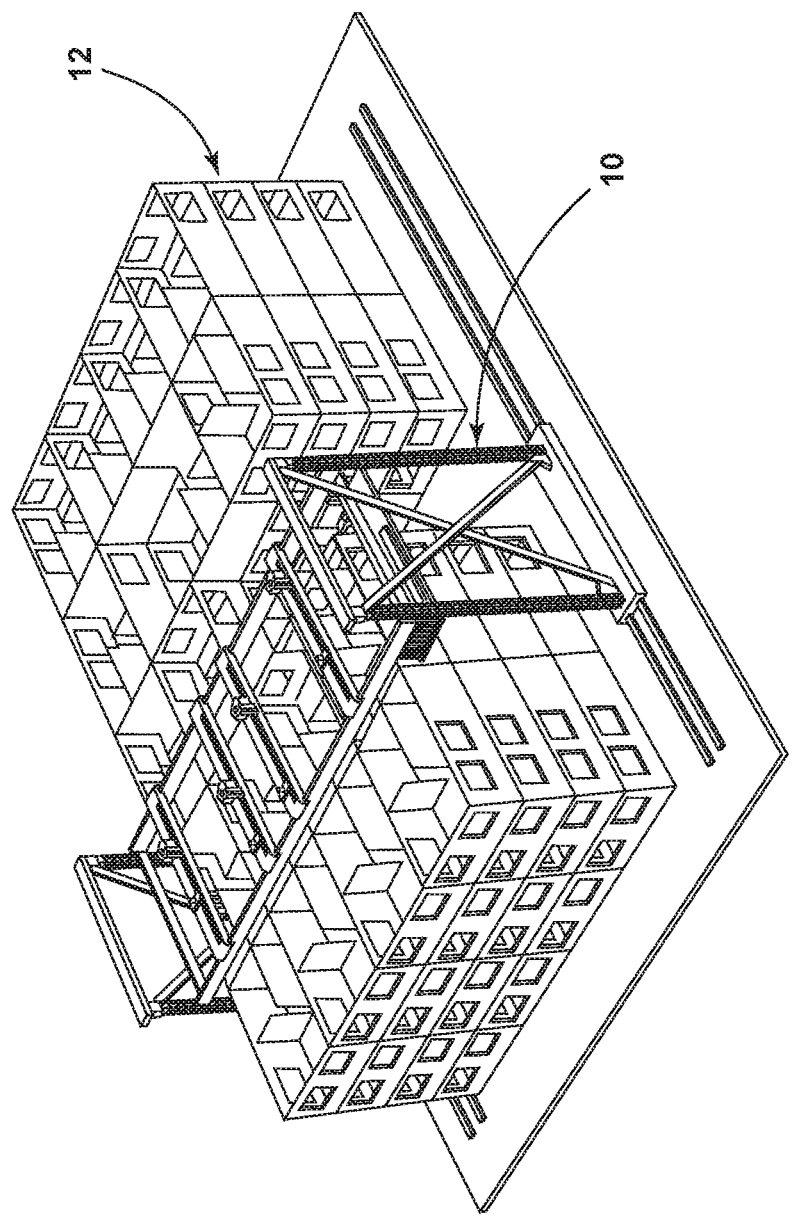
FIG. 1 is a schematic illustration of a prior art gantry system fabricating a concrete building.
Figure 2:
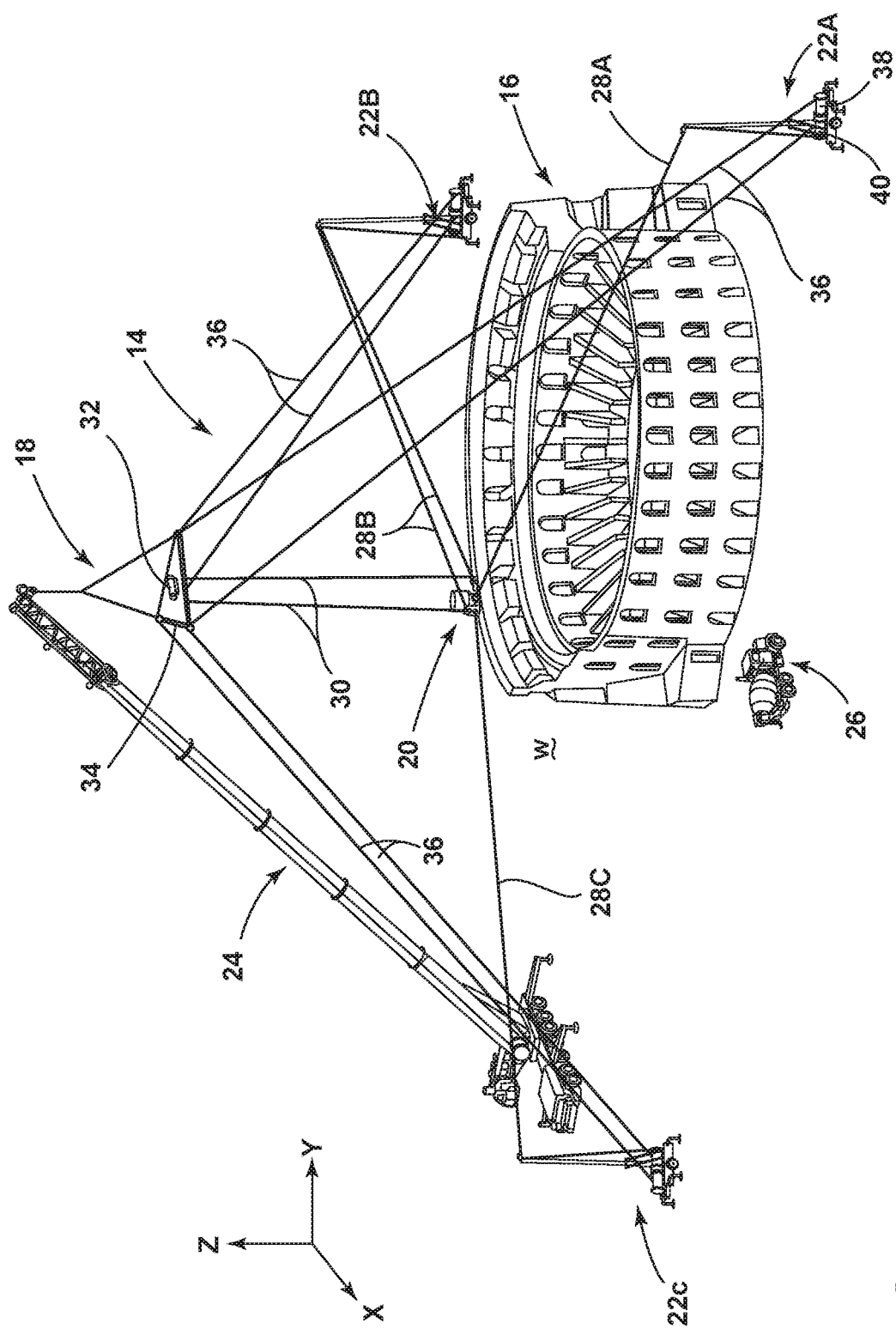
FIG. 2 is a schematic illustration of a cable-driven additive manufacturing system according to one embodiment of the invention fabricating a concrete building.

A cable-driven additive manufacturing system 14 in accordance with a first embodiment of the present invention is shown in FIG. 2. The cable-driven system 14 is shown fabricating a concrete building 16 in FIG. 2. The cable-driven system 14 is a large-scale, fieldable or easily transportable concrete deposition system, and includes an apex or aerial hoist 18, an end effector 20 including a printing or deposition head, and a plurality of base stations 22A, 22B, 22C. The cable-driven system 14 can be implemented with existing construction equipment. For example, a conventional crane 24 can be used to suspend the aerial point 18. Other equipment which can be used to suspend the aerial point 18 include, but are not limited to, a lighter-than-air balloon or a roof of an inflatable building. This implementation allows quick setup onsite with minimal site preparation. For scale, a conventional concrete truck 26 is also shown in FIG. 2.

The end effector 20 is positioned in and maneuvered within a three-dimensional (3D) workspace W of the worksite. The base stations 22A, 22B, 22C are located about the perimeter of 3D workspace W. A Cartesian coordinate system can be conceptually applied to 3D workspace W as shown in FIG. 2, and the system 14 controls linear translation of the end effector 20 along the x-axis, y-axis, and z-axis.

The end effector 20 can be any device operable to deposit concrete or other cementitious material onto the worksite. Generally, the end effector 20 can include a nozzle configured to selectively deposit the material at predefined locations based on the position of the end effector 20 within the 3D workspace W. Concrete or other cementitious material can be held in a reservoir or hopper carried by the end effector and supplied to the nozzle. Material can be supplied to the reservoir manually or automatically. For manual supply, the reservoir or hopper can be periodically refilled as material is used to fabricate a structure. Automatic supply can be done with a concrete pumping truck. A boom of the pumping truck can extend above the end effector 20 and a flexible hose can run from the extended boom to the reservoir or hopper, and provide a continuous flow of material for deposition.

In the embodiment shown, the system 14 includes three base stations 22A, 22B, 22C. The base stations 22A, 22B, 22C are mobile for transport to and from the worksite, but are statically arranged about the perimeter of the 3D workspace W during use. Adjustable cables 28A, 28B, 28C run from each base station 22A, 22B, 22C to the end effector 20. In other embodiments, the system 14 may include one or more additional base stations. Similarly, in other embodiments, one or more additional adjustable cables may be associated with any of the base stations.

Each set of adjustable cables 28A, 28B, 28C may be routed from a base station 22A, 22B, 22C and releasably secured to the end effector 20 in a manner that applies tension to the end effector 20 within the 3D workspace W. The cables 28A, 28B, 28C can be tensioned to lie substantially parallel to the x-y plane of the 3D workspace W. In operation, these cables 28A, 28B, 28C typically diverge some amount from the x-y plane and so may be up to 5 degrees, or alternatively up to 10 degrees, or alternatively up to 20 degrees from parallel to the x-y plane during operation. The adjustable cables 28A, 28B, 28C may be adjustably extended and retracted from the base stations 22A, 22B, 22C in a coordinated fashion to maneuver the end effector 20 within the 3D workspace W. As shown, at least one of the base stations 22B has two associated cables 28B, and the cables 28B may be generally parallel to each other, and may be controlled to have similar or identical lengths spanning between the base station 22B and end effector 20 during operation.

At least one adjustable suspension cable 30 runs from the aerial hoist 18 to the end effector 20. At least a portion of the suspension cable 30 extends generally vertically to hang the end effector 20 within the 3D workspace W. The system 14 includes a single aerial hoist 18 having at least one cable winder 32 or the like which controls the z-axis motion of the end effector 20. The suspension cable 30 can be adjustably extended from the cable winder 32 and retracted back on the cable winder 32. A motor (not shown) or the like can control the cable winder 32. In other embodiments of the system, the system can comprise more than one aerial hoist 16. However, in a fieldable system, it is desirable to keep the number of aerial winding points to a minimum to simplify setup onsite.

The aerial hoist 18 forms an apex of the cable configuration for the cable-driven system 14. The base stations 22A, 22B, 22C, or at least the cables 28A, 28B, 28C running from the base stations 22A, 22B, 22C to the end effector 20, are disposed below the aerial hoist 18. To integrate the system 14 with existing construction equipment or other equipment, the crane 24 or other suspender is not part of the motion system. Instead, the crane 24 or other suspender acts as a static hoist point for the aerial hoist 18. Because the crane 24 or other suspender merely provides a hoist point for the system 14, the cable-driven system 14 can be integrated with any crane or other suspender that meets the necessary height and load requirements.

In the illustrated embodiment, the aerial hoist 18 comprises a platform 34 that supports the cable winder 32. The end effector 20 is suspended from the platform 34 by the suspension cables 30. In the illustrated embodiment, the end effector 20 is suspended below the fixed platform 34 by two parallel suspension cables 30 that ensure the end effector 20 remains perpendicular to the deposition surface. The suspension cables 30 can be adjusted so that their length is always identical, and can be controlled via one common cable winder, or separate cable winders may be provided.

The suspended platform 34 is secured with guy-wires 36 to the base stations 22A, 22B, 22C. Alternatively, the guy-wires 36 can extend from the platform 34 to the ground or another static point. Cable winders 38 or the like for the guy-wires 36 can be provided on the base stations 22A, 22B, 22C, or can be provided separately from the base stations 22A, 22B, 22C. The guy-wires 36 can be adjustably extended from the cable winders 38 and retracted back on the cable winders 38. A motor (not shown) or the like can control each cable winder 38. The motors can be controlled in a coordinated fashion to stay the platform 34 at a desired location within the 3D workspace W.

Figure 3:
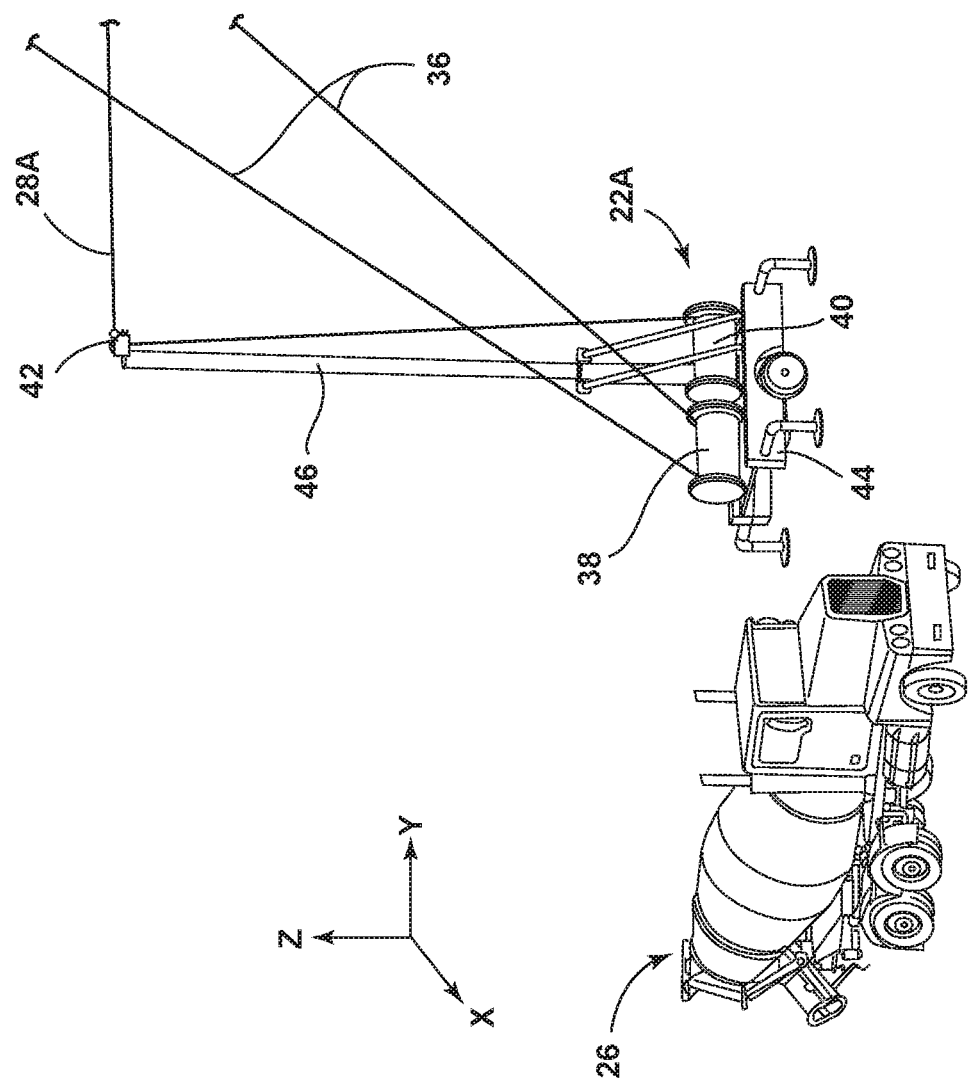
FIG. 3 is a schematic illustration of a base station for the cable-driven system of FIG. 2, with a conventional concrete truck shown for scale.

Referring to FIG. 3, each base station 22A, 22B, 22C includes at least one cable winder 40 or the like which controls the motion of the end effector 20 in the x-y plane. In FIG. 3, base station 22A is shown, but this applies for all base stations 22A, 22B, 22C of FIG. 2. Each adjustable cable 28A, 28B, 28C can be adjustably extended from one of the cable winders 40 and retracted back on the cable winder 40. For the base station 22B with two associated cables 28B (FIG. 2), the cables 28B can be controlled via one common cable winder 40, or separate cable winders may be provided. A motor (not shown) or the like can control each cable winder 40. The motors can be controlled in a coordinated fashion to maneuver the end effector 20 within the 3D workspace W, relative to the x-y plane. It is noted that as the end effector 20 is moved in the x-y plane, the suspension cables 30 will move as well.

In one embodiment, a central controller can be in operative communication with each aerial and base cable winder 32, 40, or more specifically each cable winder motor, to provide coordinated control and maneuvering of the end effector 20. The central controller can maneuver the end effector 20 in response to operator controls and end effector position control algorithms. Alternatively or additionally, the central controller can maneuver the end effector 20 in an automated or semi-automated fashion in response to a pre-programmed building plan based on position control algorithms. The central controller may include any suitable controller, including any suitable combination of a CPU, processor, microprocessor, computer, software, firmware, and any combination over various common peripheral devices or components associated with such items. Similarly, any controller associated with an individual motor or group of motors may include any suitable controller, including any suitable combination of a CPU, processor, microprocessor, computer, software, firmware, and any combination over various common peripheral devices or components associated with such items.

Optionally, the base stations 22A, 22B, 22C can include at least one pulley 42, multiple pulleys, or another suitable cable guide which route the cables 28A, 28B, 28C to change the direction of the force applied by the cables 28A, 28B, 28C. In FIG. 3, the base station 22A includes a support 44 adapted to be statically fixed to the ground or otherwise anchored at the worksite, and a vertical support post 46 extending upwardly from the support 44. The pulley 42 can be provided on the vertical support post 46, preferably at the top of the vertical support post 46. From the winder 40 to the pulley 42, the cable 28A can run generally parallel to the post 46, and from the pulley 42 to the end effector 20, the cable 28A can run generally orthogonally to the post 46.

To provide motion of the end effector 20 within the 3D workspace W along the x-, y-, and z-axes, three active actuators are required. For example, the cable winders 32, 40 of the aerial hoist 18 and two of the base stations 22A, 22B can effectively move the end effector 20 within the x-y plane of the 3D workspace W. These base stations 22A, 22B are motion-control base stations. The third base station 22C can comprise a passive actuator, such as by having a torque motor operate the winder, and provides tension only. This base station 22C is a tension-control base station.

The system 14 is always operated in tension to enhance the system stiffness. Cable flexibility is accounted for in the control systems through advanced vibration control techniques like input shaping. Absolute position feedback can be provided by GPS or a laser tracker positioned out of the 3D workspace W ensuring accurate placement of the deposited material.

The base stations 22A, 22B, 22C can be adjustable to allow the end effector 20 to print taller structures without interfering with the cables 28A, 28B, 28C. Generally, the point at which the cables 28A, 28B, 28C extend in the x-y plane away from the base stations 22A, 22B, 22C need to be able to raise up as the printed structure gets taller. In one embodiment, at least a portion of the base stations 22A, 22B, 22C can telescope to allow the end effector 20 to print taller structures without interfering with the cables 28A, 28B, 28C. For example, the vertical support post 46 can be a telescoping vertical support post 42 that adjusts the height of the pulley 42. In another example, the support 44 can telescope or be otherwise adjustable to adjust the height of the pulley 42 while maintaining a fixed distance between the cord winder 40 and pulley 42. Non-telescoping adjustment mechanisms can be used as well, such as using a linear rail to adjust the position of the pulley 42 or another portion of the base stations 22A, 22B, 22C. The adjustability of the base stations 22A, 22B, 22C can also be leveraged when setting up the work site, so that the base stations 22A, 22B, 22C do not need to be disposed on a level site, and can rather be implemented on a variety of terrain, including terrain requiring one base station 22A, 22B, 22C to be disposed higher than another base station 22A, 22B, 22C.

All cables can be releasably secured to the end effector 20 to make setup and takedown of the system 14 more streamlined. The various cables can be wound around their associated cable winders for transportation to a worksite. To set up the system 14 at a worksite, the base stations 22A, 22B, 22C are positioned about the perimeter of the 3D workspace W, and the cables 28A, 28B, 28C are attached to the end effector 20. Optionally, the base stations 22A, 22B, 22C can be contained on individual trailers, and can simply be driven onto the worksite to the correct position about the perimeter of the 3D workspace W. The aerial suspension cables 30 are also attached to the end effector 20, and the crane 24 lifts the aerial hoist 18 overhead.

After setup, the system 14 can go through a calibration routine so that the location of the end effector 20 can be tracked through 3D space. The location of the cable winders 32, 40 on the aerial hoist 18 and base stations 22A, 22B, 22C must also be known in 3D space. A laser-based time-of-flight sensor or laser tracker can be used to locate the cable winders 32, 40 and base stations 22A, 22B, 22C for initial calibration of the system 14, and can also be used to locate and track the end effector 20 during material deposition. Alternatively, GPS-based tracking can be used. Other input can be used to control the system 14 as well. For example, encoders on the various cable winders can measure the length of the extended cable.

By definition, any object in 3D space has six degrees for freedom (DOF). In order to fully constrain the end effector 20, most cable driven systems control all six DOF. However, this requires six independently controlled winders. For most additive manufacturing, only three DOF control is needed. Linear translation is necessary in all three directions; however, the three rotational degrees of freedom are not needed. Instead of controlling the rotational degrees of freedom, it is better to simply freeze them and only control the linear degrees of freedom. By carefully choosing the cable geometry and controlling multiple cables from one winder, this is achieved with the system 14. By only controlling the three DOF needed, it is possible to make a simpler system. This, in turn, aids in the ease of fieldability.

Furthermore, it is undesirable to over-constrain the system. If there are more cables than are necessary to fully constrain the system, it becomes over-constrained. In an over-constrained system, forces can quickly get quite large, and the demands on the control system are much greater. Thus, it is desirable to have an exactly constrained system.

In one example, the cable configuration of the system includes a single aerial winder that can be held by a standard crane, cable winders and anchor points at a plurality of base stations, a fully and exactly constrained end effector. All rotational degrees of freedom are frozen.

It is also desirable to keep the total number of winders and cable anchor points to a minimum. Furthermore, by concentrating cable winding points and anchor points together, the system 14 can be split into a handful of base stations 22A, 22B, 22C for deployment in the field. These base stations 22A, 22B, 22C can be integrated into a truck or trailer that can simply be driven onto the worksite to the correct position about the perimeter of the 3D workspace W.

Figure 4:
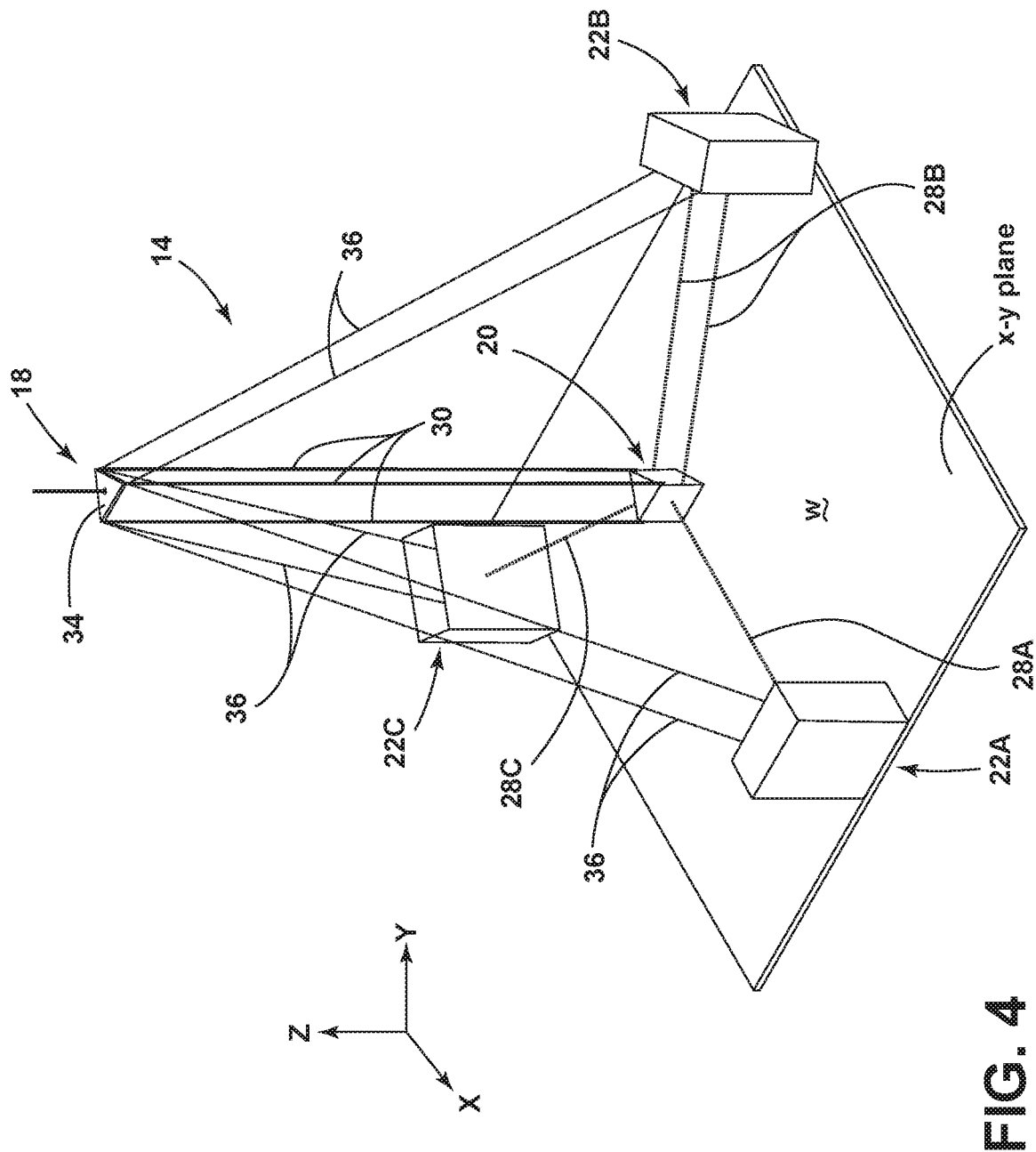
FIG. 4 is a schematic illustration of another embodiment of a cable configuration for the cable-driven additive manufacturing system.

FIG. 4 shows another embodiment of a cable configuration for the cable-driven additive manufacturing system 14. The system 14 of FIG. 4 can include the various functions and components as described in FIGS. 2-3, and like parts will be identified with like numerals. Many of the components are shown schematically in FIG. 4. One difference is that three adjustable suspension cables 30 run from the aerial hoist 18 to the end effector 20, and perform the z-axis motion. These three cables 30 all run off one cable winder 32 (FIG. 2) or the like located on the platform 34, so that their length is always identical. This keeps the end effector 20 from tilting, which freezes two rotational DOF of the end effector 20.

Motion in the x-y plane is controlled by the three cables 28A, 28B coming from two of the base stations 22A, 22B, or motion-control stations. One of these base stations 22B has two identical length cables 28B. This freezes the third rotational DOF of the end effector 20. The two cables 28B can share a common cable winder 40, and can be routed around two different pulleys 42.

A cable 28C from the third base station 22C, or tension-control station, provides tension only. By controlling the tension of its associated cable 28C, the third base station 22C provides a force that keeps the other cables 28A, 28B in tension. The third base station 22C does not contribute to the motion of the end effector 20. Consequently, the system 14 is not over-constrained. The three base stations 22A, 22B, 22C can be disposed in an approximate triangle or in a Y-shape about the 3D workspace W.

Figure 5:
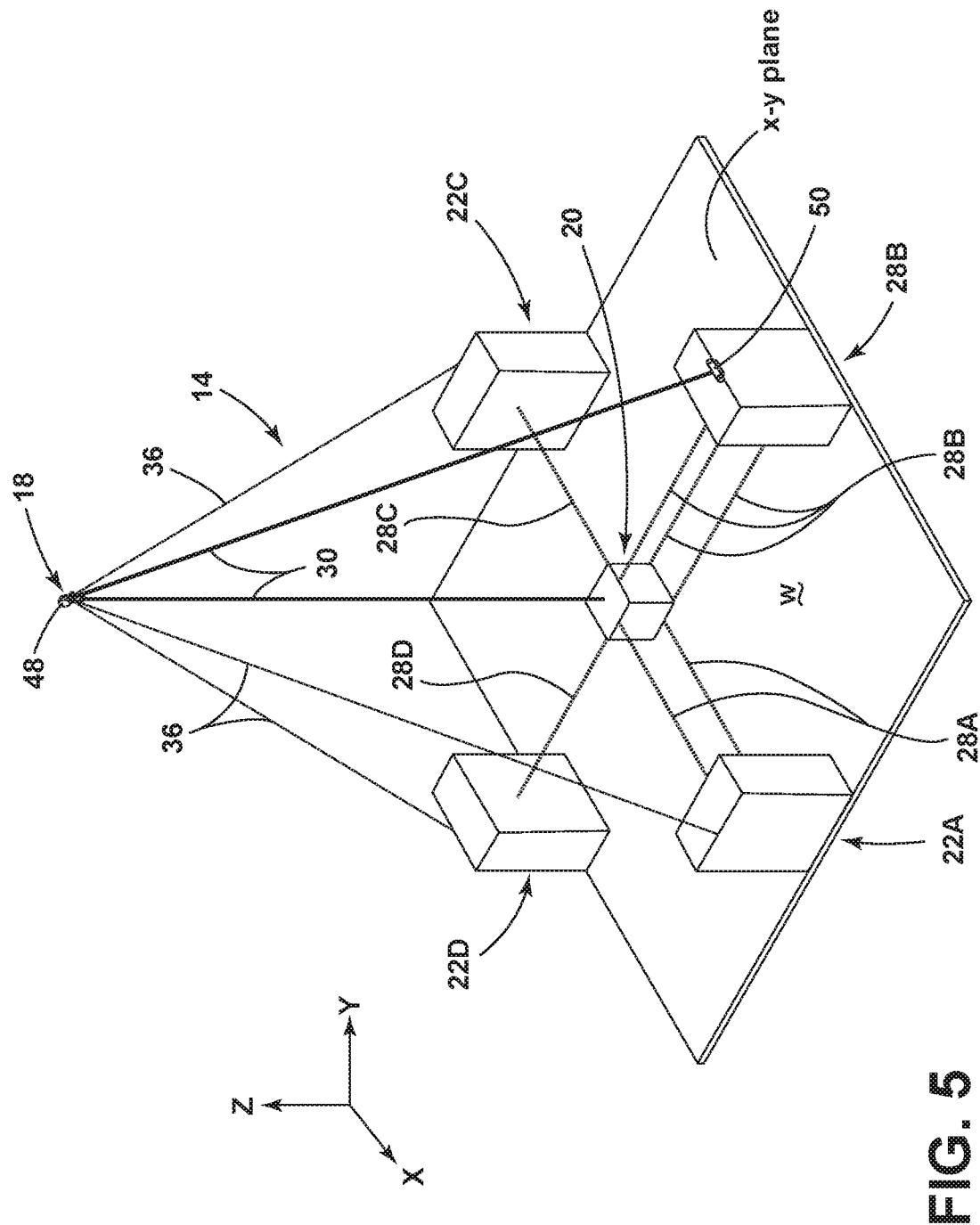
FIG. 5 is a schematic illustration of yet another embodiment of a cable configuration for the cable-driven additive manufacturing system.

FIG. 5 shows yet another embodiment of a cable configuration for the cable-driven additive manufacturing system 14. The system 14 of FIG. 5 can include the various functions and components as described in the embodiments of FIGS. 2-4, and like parts will be identified with like numerals. Many of the components are shown schematically in FIG. 5. One difference is that one adjustable suspension cable 30 runs from the aerial hoist 18 to the end effector 20, and perform the z-axis motion. Two extra cables 28A, 28B are applied to the motion-control base stations 22A, 22B. One of these base stations 22B has three identical length cables 28B. This freezes two rotational DOF of the end effector 20. The three cables 28B can share a common cable winder 40, and can be routed around three different pulleys 42. The other of these base stations 22A has two identical length cables 28A. This freezes the third rotational DOF of the end effector 20. The two cables 28A can share a common cable winder 40, and can be routed around two different pulleys 42.

Like the cable configuration of FIG. 4, the cable configuration of FIG. 5 freezes all the rotational DOF but offers several advantages to the previous embodiment. First, by putting more cables in the x-y plane, the stiffness of the system 14 is increased in the x-y plane. Although this sacrifices some of the vertical stiffness, the stiffness in the x-y plane is more important for the system 14 because most of the movement of the end effector 20 will be in this plane. The only vertical or z-axis movement will be in between layers when the end effector 20 is raised by a small increment.

The system 14 is also simplified by eliminating the aerial platform of the aerial hoist 18. Instead, the aerial hoist 18 can comprise at least one pulley 48, multiple pulleys, or another suitable cable guide which route the suspension cable 30 to change the direction of the force applied by the cable 30. With only one aerial cable 30, it is possible to run the cable 30 over the pulley 48 or another suitable cable guide and down to a cable winder 50 or the like located on one of the base stations 22B, or provided separately from the base stations 22A, 22B, 22C, 22D. The pulley 48 is still held up by the crane 24 (FIG. 2), and is held stationary with three guy-wires 36. Each of the three guy-wires 36 run from the pulley 48 or elsewhere on the aerial hoist 18 to one of the other base stations 22A, 22C, 22D. Alternatively, the guy-wires 36 can extend from the pulley 48 or aerial hoist 18 to the ground or another static point.

Another difference is that the system 14 has an additional base station 22D and cable 28D to provide tension only. The net force to keep the other cables 28A, 28B in tension is the vector sum of the tension in these two tension cables 28C, 28D. By adjusting the tension of the two tension cables 28C, 28D, the net tension vector can by adjusted to some degree to optimize the system 14. By concentrating cables to four base stations 22A, 22B, 22C, 22D and one overhead hoist 18, this system 14 is easily fieldable. The four base stations 22A, 22B, 22C, 22D can be approximately perpendicular to each other or in an X-shape about the 3D workspace W.

Figure 6:
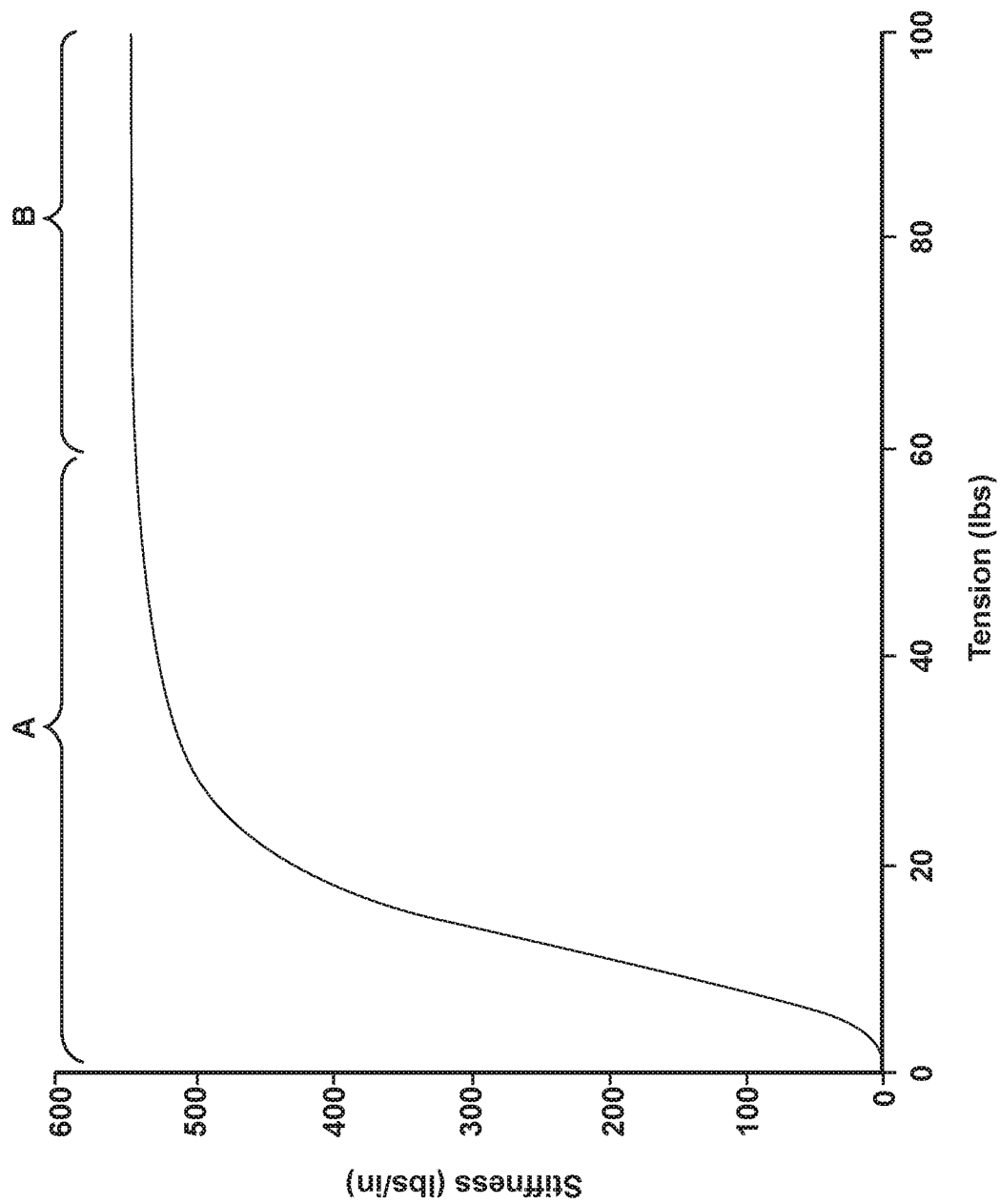
FIG. 6 is a graphical representation of a composite stiffness value that is dependent upon cable tension for a ⅛-inch 7×19 steel wire rope cable having a span of 17 ft.

With reference to FIG. 6, one concern in the design of the system 14 is the effective stiffness of the end effector 20. The stiffness will affect both the quality of prints and the speed at which material deposition can occur. In a stiffer system, the end effector 20 will deflect less under dynamic loads, leading to a more accurate and repeatable construction. Furthermore, a stiffer system leads to higher natural frequencies, which makes control of the system easier.

As mentioned above, the cable layout of the cable-driven system 14 disclosed in FIG. 5 increases the stiffness of the system 14 in the x-y plane, as this is the plane in which most of the motion of the end effector 20 occurs. Cable selection and cable tension also affect the stiffness of the system 14. In selecting a cable and the required tension for the system 14, the effects of catenary sag must be considered. A cable span under gravity sags in a well-known and well-studied shape called a catenary. The amount of catenary sag is dependent upon the amount of tension in the cable. This results in significant non-linearities in the stiffness of cables.

FIG. 6 is a graphical representation of a composite stiffness value that is dependent upon cable tension for a ⅛-inch (3.18 mm) 7×19 steel wire rope cable having a span of 17 ft (5.18 m). The composite stiffness value was determined by combining the non-linear stiffness produced by catenary sag of the steel wire cable along with the elastic stiffness of the steel wire cable. As shown in FIG. 6, there is point where the contribution of the catenary sag to the stiffness becomes negligible, and the stiffness remains approximately constant with increasing tension. Cable stiffness can be classified into a non-linear range A, in which stiffness increases with increasing tension and a linear range B, in which stiffness remains approximately constant with increasing tension. This behavior is consistent across different cable types and sizes.

In certain embodiments, the system 14 is preferably operated to maintain the cables 28A, 28B, 28C, 28D in the linear range for several reasons. First, this is the highest stiffness range of the cable. As stiffness is a priority in the x-y plane, this alone provides significant motivation to operate in the linear range. Second, analysis and control of linear systems is significantly easier as compared to non-linear systems.

The cable itself determines the amount of tension required to reach the linear range of a cable as well as the value of the stiffness of the cable within the linear range. The elastic stiffness, the weight of the cable, and the length of the cable play a significant role in amount of tension. To complicate things further, the elastic stiffness of the cable is affected not only by the material, but also by the way the fibers are woven within the cable. The cable used will also affect the power requirements for the motors in the cable winders. Some suitable examples for the cables 28A, 28B, 28C, 28D that can fulfill the requirements of the system 14 include 7×19 steel wire rope and ropes made from ultra-high-molecular-weight polyethylene (UHMWPE) fibers, such as Dyneema® ropes.

For the cables 28A, 28B, 28C, 28D to operate within the linear range of stiffness, all of the cables 28A, 28B, 28C, 28D are kept at a predetermined minimum tension. The minimum tension is based on a given cable type and span and is the minimum tension needed to keep the cable in the linear range of stiffness. Therefore, as the end effector 20 is moved and the span of the cables 28A, 28B, 28C, 28D change, the minimum tension changes.

As mentioned above, for the system 14 of FIG. 5, there are two tensioning cables 28C, 28D that keep all the motion-control cables 28A, 28B in tension. This allows for some control of the net tension vector. In the system 14, the tension of all cables 28A, 28B, 28C, 28D can be controlled to stay above the minimum tension required to keep them in their linear stiffness range. There can be more than one tensioning solution that meets this requirement. Some tensioning solutions may involve tensions in a few of the cables 28A, 28B, 28C, 28D that are well above the minimum tension. However, it is not desirable to apply more tension than required. This produces no benefit, and it only serves to increase the required motor power and the required strength of the components of the system 14. Thus, the system 14 is preferably operated with a tensioning solution that keeps all of the cables 28A, 28B, 28C, 28D above their minimum tension requirement and has the lowest maximum tension in any one of the cables 28A, 28B, 28C, 28D from all possible options. The required tension in the tensioner cables 28C, 28D will obviously vary as the end effector 20 traverses the 3D workspace W.

Figure 7:
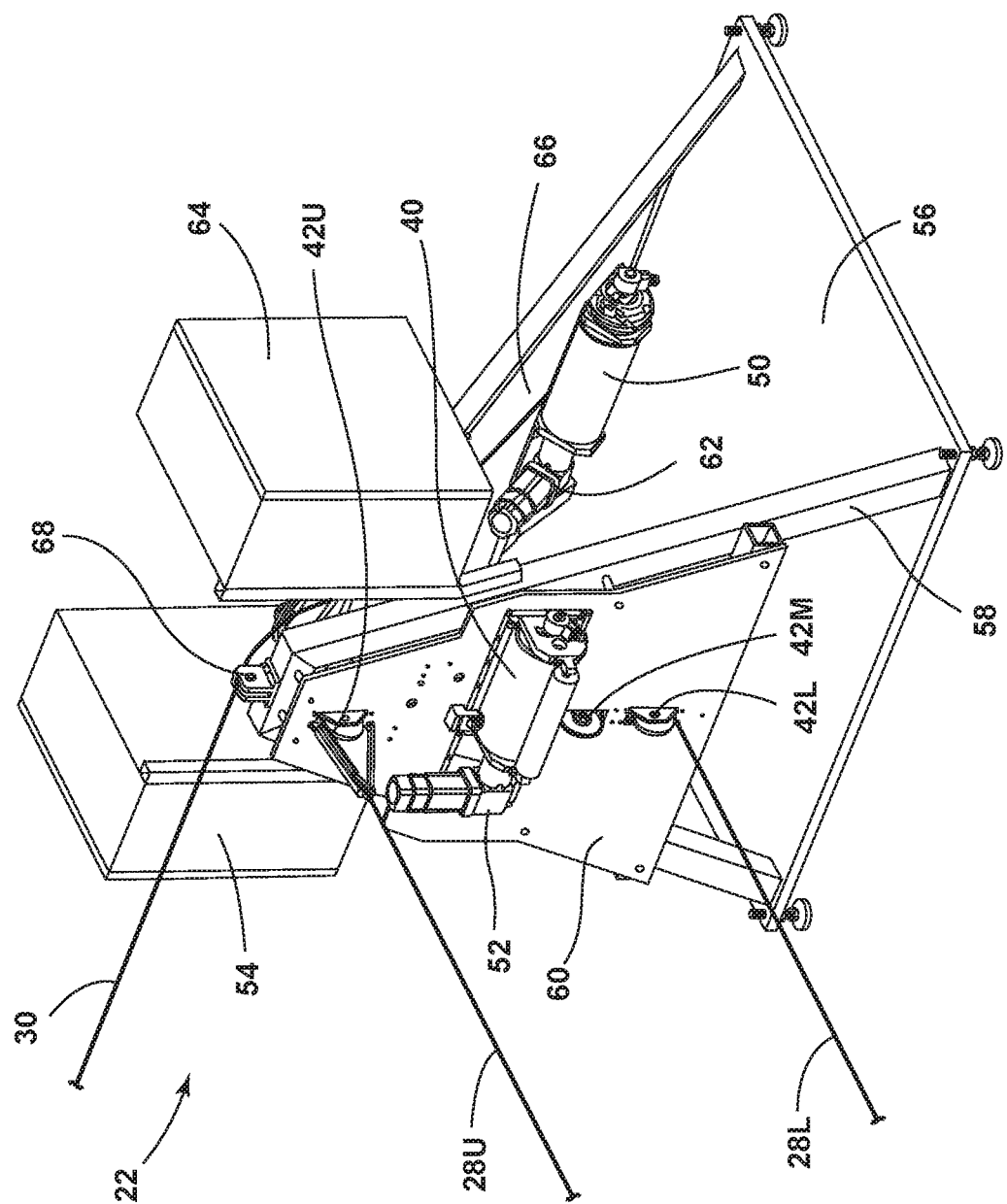
FIG. 7 is an isometric view of one embodiment of a base station for the cable-driven additive manufacturing system.

FIG. 7 is an isometric view of one embodiment of a base station 22 for the cable-driven additive manufacturing system 14. The base station 22 of FIG. 7 can include the various functions and components as described in the embodiments of FIGS. 2-5, and like parts will be identified with like numerals. The base station 22 can be a motion-control base station, and in the illustrated embodiment, two adjustable motion-control cables 28U, 28L run from the base station 22 to an end effector (not shown). Alternatively, one adjustable cable or three adjustable cables may be associated with the base station 22, as described above for the previous embodiments. The base station 22 can mobile for transport to and from the worksite, and is configured to be statically arranged about the perimeter of the 3D workspace W during use.

The base station 22 includes one cable winder 40, and both cables 28U, 28L can be adjustably extended from the cable winder 40 and retracted back on the cable winder 40. A motor 52 or the like can control the cable winder 40. The motor 52 can be can be in operative communication with a winder motor controller and power supply 54, which provides power to and control of the winder motor 52 to operate the cable winder 40. The winder motor controller and power supply 54 can be in operative communication with a central controller as described above The base station 22 includes one pulley 42U disposed above the cable winder 40, and two pulleys 42M, 42L disposed below the cable winder 40. The first or upper motion-control cable 28U runs from the cord winder 40, wraps around the upper pulley 42U, and extends to the end effector. The second or lower motion-control cable 28L runs from the cord winder 40, winds around the middle pulley 42M, wraps around the lower pulley 42, and extends to the end effector.

The base station 22 can include a support 56 adapted to be statically fixed to the ground or otherwise anchored at the worksite, and a framework 58 extending upwardly from the support 56. The framework 58 can include a support surface 60 for the cable winder 40 and pulleys 42U, 42M, and 42L. From the pulleys 42U, 42M, and 42L to the end effector, the cables 28U, 28L can run generally orthogonally to the support surface 60.

The base station 22 can be adjustable to allow the end effector to print taller structures without interfering with the cables 28U, 28L. As described above, generally, the point at which the cables 28U, 28L extend in the x-y plane away from the base station 22 needs to be able to raise up as the printed structure gets taller. In one embodiment, at least a portion of the base station 22 can telescope to raise the pulleys 42U, 42M, and 42L. For example, the support surface 60 can be a telescoping support surface 60, the framework 58 can be a telescoping framework 58, or the support 56 can telescope or be otherwise adjustable.

Figure 8:
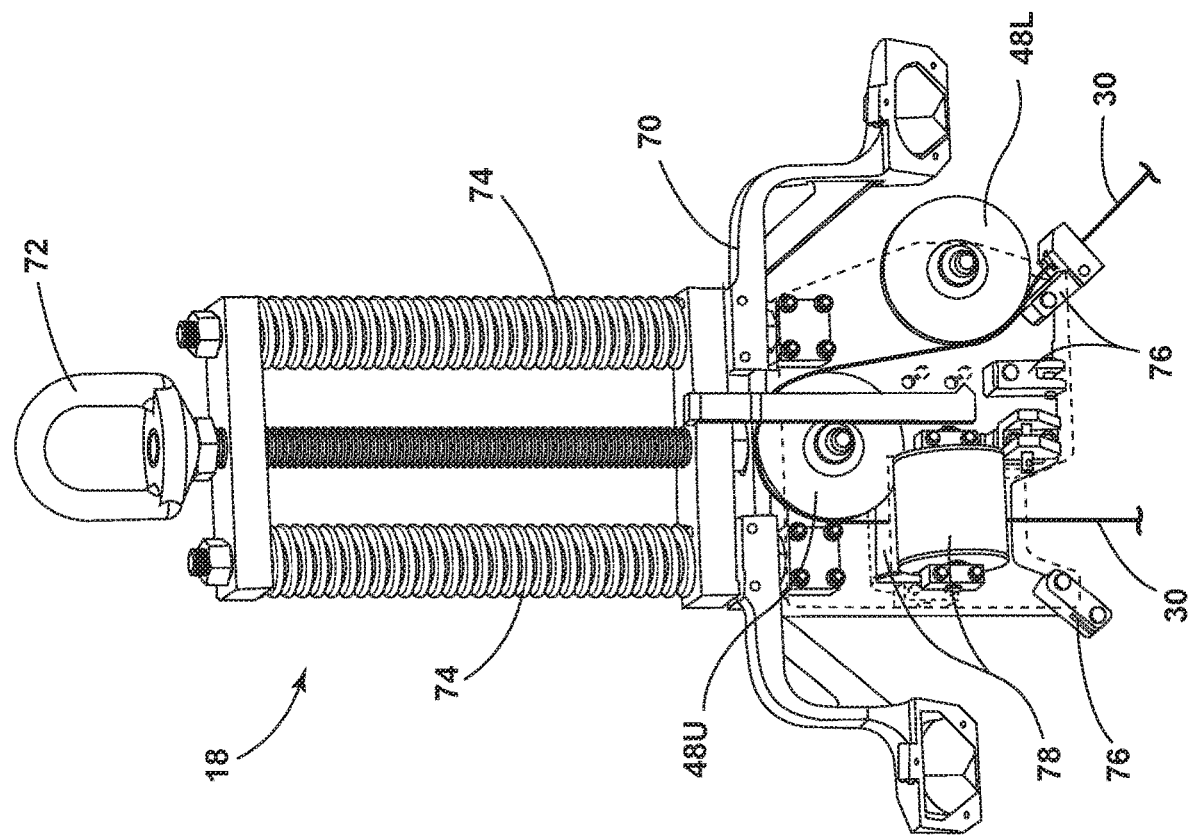
FIG. 8 is an isometric view of one embodiment of an aerial hoist for the cable-driven additive manufacturing system.

The base station 22 can optionally include a cable winder 50 for a suspension cable 30 used to adjust the position of an aerial hoist 18 (FIG. 8). The suspension cable 30 can be adjustably extended from the cable winder 50 and retracted back on the cable winder 50. A motor 62 or the like can control the cable winder 50. The motor 62 can be can be in operative communication with a winder motor controller and power supply 64, which provides power to and control of the winder motor 62 to operate the cable winder 38. The winder motor controller and power supply 64 can be in operative communication with a central controller as described above.

The cable winder 50 can be supported on the framework 58, or elsewhere on the base station 22. In the illustrated embodiment, the cable winder 50 is disposed on second support surface 66 of the framework 58, which is disposed rearwardly of the first support surface 60. The base station 22 can include at least one pulley 68, or another suitable cable guide, which routes the suspension cable 30 around the framework 58 or another portion of the base station 22 to reach the cable winder 50.

FIG. 8 is an isometric view of one embodiment of an aerial hoist 18 for the cable-driven additive manufacturing system 14. The aerial hoist 18 of FIG. 8 can include the various functions and components as described in the embodiments of FIGS. 2-5, and like parts will be identified with like numerals. In the illustrated embodiment, one adjustable suspension cable 30 runs from a base station 22 (FIG. 7), through the aerial hoist 18 to an end effector (not shown). The suspension cable 30 can be adjustably extended from and retracted back on a cable winder 50 (FIG. 7) on the base station 22. Alternatively, more than one adjustable suspension cable may be associated with the aerial hoist 18, as described above for the previous embodiments.

The aerial hoist 18 can suspended by existing construction equipment, such as a conventional crane 24 (FIG. 2). The aerial hoist 18 forms an apex of the cable configuration for the cable-driven system. The aerial hoist 18 can include a framework 70 that is hung from the crane 24 by a connector 72. Springs 74 can be provided between the connector 72 and the framework 70 to provide compliance between the aerial hoist 18 and the crane 24, which may sway during operation, and to prevent the crane 24 from pulling up too hard on the aerial hoist 18. Guy-wire connectors 76 are provided on the framework 70 for securing the aerial hoist 18 with guy-wires (not shown).

The aerial hoist 18 includes two pulleys 48U, 48L or other suitable cable guides that route the suspension cable 30 to change the direction of the force applied by the cable 30. The suspension cable 30 runs from the base station 22 (FIG. 7), winds around the lower pulley 48L, wraps up and around the upper pulley 48U, and extends down to the end effector. Rollers 78 can frictionally engage the cable 30 to keep the cable 30 engaged with the upper pulley 48U. The framework 70 can support the pulleys 48U, 48L and the rollers 78. It is noted that in FIG. 8, a portion of the framework 70 is illustrated in phantom line for clarity.

There are several advantages of the present disclosure arising from the various aspects or features of the apparatus, systems, and methods described herein. For example, the various embodiments of the additive manufacturing systems and methods disclosed herein can be employed at large-scale work sites without requiring massive equipment and machinery. The cable-driven system does not require the same level of site preparation as gantry-based systems. With the cable-driven system disclosed herein, cable winders can be placed around the worksite via the base stations. This does not require leveling of the site, and can be implemented on a wide variety of terrain. Furthermore, the base stations are small compared to the work site leaving more open space available for construction and the maneuvering of equipment and workers. Still further, the cable-driven system disclosed herein integrates with existing construction equipment.

Another advantage of the various embodiments of the additive manufacturing systems and methods disclosed herein is the single lift point or aerial hoist. Most cable driven robots have cable winders at multiple aerial points. In a situation where the robot is permanently installed in a building or high-bay, this not a problem as these winders can be affixed to a large frame or to the columns of the building itself. However, in an outdoor fieldable platform this is less practical. The cable-driven system disclosed herein has an aerial hoist suspending by existing construction equipment, namely a crane, or a balloon. Implementing a crane suspended system will allow for much quicker machine set up and versatility in construction site location.

Yet another advantage of the various embodiments of the additive manufacturing systems and methods disclosed herein is that the crane or other suspender acting as a static hoist point for the system does not need to have high rigidity, it only needs to supply sufficient upward force. Conventional cranes are not rigid; rather they have a fairly low effective spring rate and so would be unsuitable to use with prior additive manufacturing systems which require rigidity. In contrast, the various embodiments of the additive manufacturing systems and methods disclosed herein can be with a crane, a lighter-than-air balloon, the roof of an inflatable building, or other systems without high rigidity but which provide sufficient upward force for the system.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A cable-driven additive manufacturing system comprising:
   an end effector configured for linear translation within a three-dimensional workspace along an x-axis, a y-axis, and a z-axis;
   an aerial hoist suspending the end effector within the three-dimensional workspace by at least one suspension cable, the aerial hoist having a static position within the three-dimensional workspace whereby the aerial hoist is not translated along the x-axis with the end effector and the aerial hoist is not translated along the y-axis with the end effector;
   an aerial cable winder configured to control linear translation of the end effector along the z-axis;
   a plurality of motion-control base stations disposed below the aerial hoist and configured to control linear translation of the end effector in an x-y plane defined by the x-axis and the y-axis, each motion-control base station comprising a base station cable winder;
   a plurality of motion-control cables, at least one of the plurality of motion-control cables running from each of the base station cable winders to the end effector;
   at least one tension-control base station; and
   at least one tension-control cable running from the tension-control base station to the end effector.

2. The additive manufacturing system of claim 1, wherein the plurality of motion-control base stations comprises at least two motion-control base stations.

3. The additive manufacturing system of claim 2, wherein the at least one tension-control base station comprises a first tension-control base station and a second tension-control base station spaced from the first tension-control base station, and the at least one tension-control cable comprises a first tension-control cable running from the first tension-control base to the end effector and a second tension-control cable running from the first tension-control base to the end effector.

4. The additive manufacturing system of claim 1, wherein the plurality of motion-control cables and the at least one tension-control cable are tensioned to lie substantially parallel to the x-y plane.

5. The additive manufacturing system of claim 4, wherein the at least one suspension cable includes at least a portion extending along the z-axis.

6. The additive manufacturing system of claim 1, wherein at least one of the plurality of motion-control base stations comprises a pulley supporting the associated motion-control cable to change the direction of the force applied by the associated motion-control cable.

7. The additive manufacturing system of claim 6, wherein the at least one of the plurality of motion-control base stations comprises a telescoping portion to adjust the height of the pulley.

8. The additive manufacturing system of claim 1, wherein at least one of the plurality of motion-control base stations comprises two motion-control cables running to the end effector, wherein the two motion-control cables are parallel to each other.

9. The additive manufacturing system of claim 8, wherein at least one other of the plurality of motion-control base stations comprises three motion-control cables running to the end effector, wherein the three motion-control cables are parallel to each other.

10. The additive manufacturing system of claim 9, wherein the at least one suspension cable comprises a single suspension cable.

11. The additive manufacturing system of claim 1, wherein the aerial hoist comprises a platform which supports the aerial cable winder, and the end effector is suspended from the platform by the at least one suspension cable, wherein the at least one suspension cable can be adjustably extended from the aerial cable winder on the platform and retracted back on the aerial cable winder on the platform.

12. The additive manufacturing system of claim 11, wherein the at least one suspension cable comprises at least two suspension cables suspending the end effector below the platform.

13. The additive manufacturing system of claim 1, wherein the aerial hoist comprises a pulley supporting the at least one suspension cable to change the direction of the force applied by the at least one suspension cable.

14. The additive manufacturing system of claim 13, wherein the aerial cable winder is provided on one of the plurality of motion-control base stations or on the at least one tension-control base station, wherein the at least one suspension cable can be adjustably extended from the aerial cable winder and retracted back on the aerial cable winder.

15. The additive manufacturing system of claim 1, wherein the aerial hoist comprises a single aerial hoist configured to be suspended by a crane.

16. The additive manufacturing system of claim 1, further comprising at least one guy-wire extending between the aerial hoist and each of the plurality of motion-control base stations and the at least one tension-control base station.

17. The additive manufacturing system of claim 16, wherein each motion-control base station and the at least one tension-control base station comprises a guy-wire cable winder, wherein each of the guy-wires can be adjustably extended from their respective guy-wire cable winder and retracted back on their respective guy-wire cable winder.

18. The additive manufacturing system of claim 1, wherein the system is operated to maintain the plurality of motion-control cables in a linear range of stiffness in which the contribution of catenary sag of the plurality of motion-control cables becomes negligible and the stiffness remains approximately constant with increasing tension.

19. The additive manufacturing system of claim 18, wherein the plurality of motion-control cables are tensioned to at least a predetermined minimum tension comprising a minimum tension at which cable stiffness remains approximately constant with increasing tension.

20. The additive manufacturing system of claim 18, wherein at least one of the plurality of motion-control cable comprises one of a 7×19 steel wire rope and a rope made from ultra-high-molecular-weight polyethylene fibers.

* * * * *

UNITED STATES PATENT AND TRADEMARK OFFICE
CERTIFICATE OF CORRECTION

PATENT NO. : 11,230,032 B2 Page 1 of 1
APPLICATION NO. : 16/383105
DATED : January 25, 2022
INVENTOR(S) : Brian K. Post et al.

It is certified that error appears in the above-identified patent and that said Letters Patent is hereby corrected as shown below:

In the Claims

Column 14, Claim 20, Line 36:
"cable" should be -- cables --

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*